3,452,936
REDUCTION OF CEREAL GRAINS TO FLOUR
William F. Hanser, Cedar Rapids, Iowa, assignor to National Oats Company, Cedar Rapids, Iowa, a corporation of Illinois
No Drawing. Filed Jan. 20, 1966, Ser. No. 521,828
Int. Cl. B02c 1/00, 23/00
U.S. Cl. 241—8                                                7 Claims

ABSTRACT OF THE DISCLOSURE

In grinding cereal grains to flour, which normally brings about rupturing of cells increasing the requirement of water in the use of the flour and the danger of acidity in the product, it is found that such cell rupture can be almost eliminated by chilling the kernels to an embrittlement state at a temperature of about −50 to −225 degrees F. and then grinding the kernels while so embrittled whereby less than 1% of the cells are ruptured.

---

This invention relates to the reduction of cereal grains to flour, such as a coarse or fine flour granulations, etc. The invention is particularly useful in preparing products for further processing and in which damage to the kernel cells is undesirable.

In the reduction of the kernels of cereal grains, such as, for example, oats, wheat, corn, popcorn, rice, etc., a number of problems have long existed. In grinding the kernels to a fine condition, there is a high horsepower cost. Further, the mechanical heat produced from the attrition in grinding raises the temperature of the product into the maximum reproduction range of bacteria. For example, flat sour spores and thermophilic bacteria thrive at temperatures of 130° F., and this temperature is attained in the grinding of groats to form oat flour. Further, in the grinding operation, fire and explosions can occur when the oxygen ratio is sufficiently high, and this presents a hazard.

The problem is further complicated by rancidity dangers arising from the cracking of fat molecules which are split into free fatty acids which in turn develop rancidity in the product. The cell damage produced in grinding further has an adverse effect on the protein, amino acids and vitamins. If the cells can be preserved intact and the protein, amino acids, vitamins, etc., preserved in their natural state, it is found that they can be utilized by animals and humans more completely. Assimilation of the proteins, amino acids and vitamins is greatly improved when the cells are not damaged in the manufacturing process.

A still further problem arises out of the losses in the various processing steps, so that the yield of product is not as high as that desired. The rupturing of cells which occurs during grinding and other processing steps further provides a problem when the products are to be employed for further processing. For example, where the ground material, such as flour, is to be formed into breakfast cereals, etc., more water has to be added to the ground material where the cells have been substantially ruptured than where the cells are more nearly intact. The added water necessarily has to be removed in later processing, and since some of this water becomes water of constitution, substantial heating is made necessary.

I have discovered that by chilling the kernels of cereal grains under cryogenic conditions to an embrittlement temperature and thereafter grinding under cryogenic conditions to a controlled degree, a product of the desired fineness can be obtained with a minimum of ruptured cells, as, for example, less than 0.5 to 1.0 percent. Further, the grinding is accomplished in a time period less than half of that required at ambient temperatures, and a substantially higher yield is obtained. By using cryogenic materials for grinding, the high temperatures providing the maximum reproduction of bacteria are avoided and the bacteria do not increase but remain dormant at the low temperatures. Further, the use of the cryogenic materials dilutes the oxygen, reducing the oxygen ratio and thus reducing the hazard of fire and explosion. The cryogenic materials further provide a rancidity and free acid control, and the protein, amino acids and vitamins are kept within their natural state where they can be best assimilated or utilized by animals and humans.

A primary object of the invention, therefore, is to provide a process for reducing kernels of cereal grains to a fine condition with a minimum of damage to the cell structure. A further object is to provide such a process while utilizing less horsepower in grinding and providing a higher yield of a product of the desired fineness. A still further object is to provide a process in which the cereal kernel is chilled to an embrittlement stage or condition, permitting rapid grinding while preserving the mass of the kernel cells intact. Other specific objects and advantages will appear as the specification proceeds.

In one embodiment of my invention, the kernel of the cereal grain is chilled by the use of liquid nitrogen, $CO_2$, and other well-known means for obtaining cryogenic conditions to a temperature at which the kernel is embrittled and at which it may be readily ground in a minimum of time to a fine condition. Such embrittlement can be brought about almost instantaneously by reducing the temperature to −50 to −225° F. I prefer to employ a temperature range of about −80 to −110° F. The kernels while still embrittled are passed into a grinder equipped with an appropriate chamber for handling sub-zero temperatures, and the grinding is accomplished while the kernels are in the embrittled condition. For example, the embrittled kernels may be passed to an insulated grinding chamber of a hammer mill and the grinding accomplished in the mill.

The grinding time is reduced greatly over the time required for grinding the kernels for the desired fineness at ambient temperatures, such time being less than half the time required for grinding the kernels under ambient temperatures. Since the grinding time varies with the type of grinding devices employed, it is sufficient to state here that the grinding is carried on for a period sufficient to produce a product having less than one percent of its cells ruptured. This time interval can be readily determined by examining the product produced by a specific grinder and the interval required for producing the product. For example, employing a hammer mill and a one horsepower motor and in producing an oat flour product of which 90 percent passes a U.S. standard #35 screen, a grinding period of 2½ hours would be required.

In the preparation of an oat flour product, I prefer to first steam the groats for about 5 minutes at a temperature of about 230° F. to inactivate the lipase enzyme and other enzymes, and thereafter the groats are cooled and chilled to a temperature of about −80 to −110° F. to embrittle the groats. The embrittled groats are then ground in a hammer mill to a 100 percent oat flour.

In the treatment of wheat berries or kernels, the same procedure may be followed. If desired, the steam step may be omitted and the wheat berry first abraded in suitable apparatus, as, for example, a barley pearler to remove the bran layer and, if desired, the wheat germ, and thereafter the material may be chilled to a temperature of −50 to −125° F. or within the range of about −80 to −110° F., and the product then ground to a wheat flour product.

The process may be employed with or without the foregoing modifications in the treatment of popcorn, rice, field corn, barley, rye, and similar cereal grains.

The following examples may be set out as illustrative of embodiments of the invention:

Example I

One hundred pounds of oat groats were steamed at a temperature of 230° F. for 5 minutes to stabilize the enzyme. The groats were then cooled to about 80° F. and then chilled with liquid nitrogen to a temperature of —110° F. The groats were then ground in a Fitz hammer mill having an insulated grinding chamber at the rate of $3.45 \times 10^{-3}$ horsepower per pound per hour. The consumption of liquid nitrogen was 0.72 pound of liquid nitrogen per pound of groats. The screen size was 0.040″. The screen analysis of the product was 99.5 percent through a U.S. standard #35 sieve, 87.5 percent through a U.S. standard #50 sieve, and 62.3 percent through a U.S. standard #70 sieve. An analysis of the flour found that it had only 0.5 percent cell damage. In other words, 99.5 percent of the cells were intact.

Example II

The process was carried on as described in Example I except that the screen size was 0.020″ and the power requirement was $4.93 \times 10^{-3}$ horsepower per pound per hour, with a liquid nitrogen consumption of 1.18 pounds per pound of oat groats. The screen analysis was 100 percent through a U.S. standard #35 sieve, 94.0 percent through a U.S. standard #50 sieve, and blinds U.S. standard #70.

The yields obtained in Examples I and II were 5 to 8 percent more than the yields obtained in normal operations where the processing was at ambient temperatures, while at the same time the quality of the flour was comparable.

Example III

In applying the process to wheat, the wheat is first washed to remove impurities and then the entire wheat kernel is ground to the desired fineness, using liquid nitrogen and cooling to room temperature, the detailed procedure with respect to grinding and chilling being substantially as described in Example I.

Example IV

In applying the process to wheat and in addition to washing the wheat to remove impurities, the wheat may be scoured with a scourer or pearler to remove the bran and the scoured and pearled wheat kernels ground along with the cryogenic material ($CO_2$) to the desired granulation and the ground product cooled to room temperature. The product may be purified, if necessary, and air classified to the desired protein or granulation levels.

While in the foregoing specification I have set out procedure in considerable detail for the purpose of illustrating embodiments of my invention, it will be understood that such details may be varied widely by those skilled in the art without departing from the spirit of my invention.

I claim:
1. In process for reducing kernels of cereal grain to flour, the steps of chilling the kernels thereof to an embrittlement state at a temperature in the range of about —50 to —225° F., and grinding the kernels in said chilled embrittlement state to a flour fineness with less than one percent of the cells ruptured.

2. In a process for reducing the kernels of a cereal grain to a fine condition with a minimum of ruptured cells, the steps of chilling the kernels to embrittle the cells thereof at a temperature in the range of about —50 to —225° F., and grinding the kernels while they are still embrittled.

3. The process of claim 1 in which the kernels are chilled to about —80 to about —110° F.

4. In a process for reducing oat groats to a fine condition with a minimum of ruptured cells, the steps of steaming the groats at a temperature of about 230° F. for about five minutes to stabilize the enzymes thereof, cooling the groats to about room temperature, and chilling the groats to about —50 to —225° F. and, while still embrittled, grinding the groats.

5. The process of claim 4 in which the grinding is discontinued when the groat material has the fineness of flour and at least 99.5 percent of the cells are still intact.

6. In a process for reducing wheat kernels to a fine condition with a minimum of ruptured cells, the steps of washing the kernels to remove impurities, chilling the kernels to an embrittlement state at a temperature in the range of —50 to —225° F., grinding the kernels in said chilled embrittled state to a fine condition, and cooling the product to room temperature.

7. The process of claim 6 in which the bran of the wheat kernels is first removed before grinding the kernels.

References Cited

UNITED STATES PATENTS

| Re. 17,829 | 10/1930 | Dienst | 241—8 XR |
| 117,271 | 7/1871 | Fitts | 146—221.7 XR |
| 1,954,650 | 4/1934 | Schaufelberger | 146—228 XR |

FOREIGN PATENTS

| 21,931 | 12/1914 | Great Britain. |
| 142,073 | 7/1951 | Great Britain. |
| 965,206 | 7/1964 | Great Britain. |

ROBERT C. RIORDAN, *Primary Examiner.*

D. G. KELLY, *Assistant Examiner.*

U.S. Cl. X.R.

241—23